UNITED STATES PATENT OFFICE.

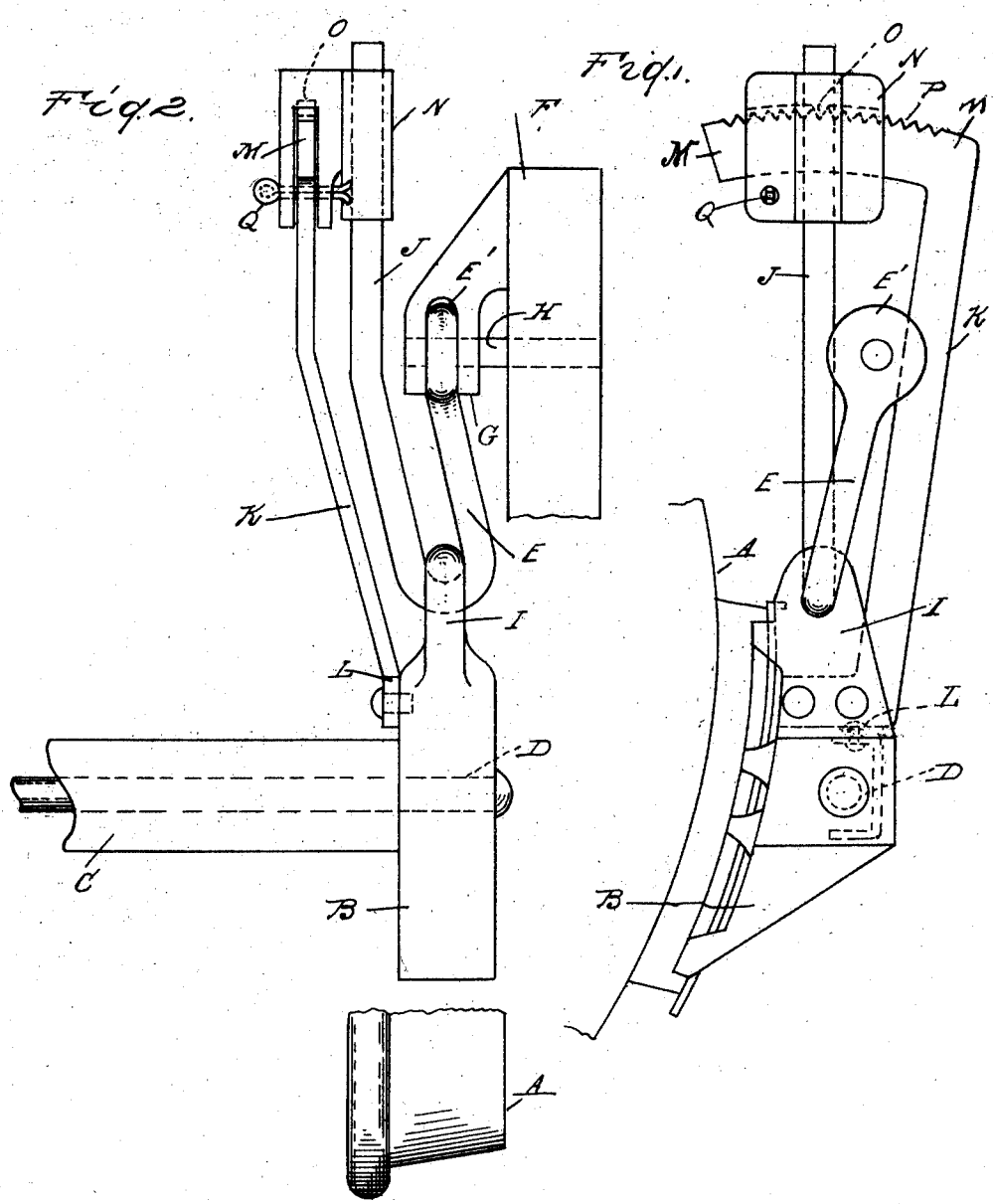

FREDERICK M. WHYTE, OF TARRYTOWN, NEW YORK.

BRAKE-HANGER.

1,396,945.   Specification of Letters Patent.   Patented Nov. 15, 1921.

Application filed January 16, 1920. Serial No. 351,882.

*To all whom it may concern:*

Be it known that I, FREDERICK M. WHYTE, a citizen of the United States of America, residing at Tarrytown, in the county of Westchester and State of New York, have invented certain new and useful Improvements in Brake-Hangers, of which the following is a specification, reference being had therein to the accompanying drawings.

The invention relates to hangers for brake beams and of that type which permits the automatic adjustment on the hanger of the head to bear uniformly against the tread of the wheel, and also to prevent dragging when the brake is released. It is the object of the invention to obtain a simplified construction avoiding the use of springs or other easily breakable parts, and also one which is effective in its operation. To this end, the invention consists in the construction as hereinafter set forth.

In the drawings:

Figure 1 is a side elevation of the construction;

Fig. 2 is an end elevation thereof.

A indicates the wheel, B the brake head, C the brake beam, connected to the head at D, and E the hanger which is supported from the truck frame F through the medium of the bifurcated bracket G and pin H, these parts being all of usual and known construction.

The hanger E is usually formed of a rod having an eye E' at its upper end for engaging the pin H, while at its lower end there is provided a hook for engaging a loop I on the brake head. With my improved construction this hook is extended so as to pass upward in a substantially vertical plane, as indicated at J, clearing the bracket G. K is an arm, preferably formed of a flat bar, bent to have a portion L, which is riveted or otherwise secured to the brake head, and a laterally-extending segmental portion M at its outer end which extends in a plane parallel to the upper portion of the member J. N is a dog, which is vertically apertured to slidably engage the upper portion of the member J and which is also slotted to engage the segment M, being provided with a V-shaped tooth O for engaging any one of a series of notches P in the upper edge of said segment. Accidental disengagement from the member J and segment M is prevented by a cotter pin Q which extends across the slot beneath the segment M.

With the construction as described, whenever the brakes are set, the face of the head will be pressed into conformity to the tread of the wheel and if any angular adjustment of the head is required, this will be effected by a movement of the segment M in relation to the member J and dog N. Such adjustment is permitted by reason of the fact that the V-shaped notches P will force the tooth O out of engagement therewith whenever sufficient pressure is exerted, but ordinarily the tooth will remain in locking engagement with the notch which it is in. Therefore, when the brake is released and the hanger is swung rearward, the angle between the head, beam and associated parts relative to the hanger will be maintained and the head will be held out of dragging contact with the wheel. The mechanism is free from any springs or bearing surfaces which are likely to stick through corrosion, so that there is nothing to render the device inoperative. Furthermore, it is exceedingly simple and inexpensive to manufacture.

What I claim as my invention is:

1. The combination with a brake head and a hanger therefor, of a gravity dog, and coöperating means for yieldably holding said head in angular adjustment to said hanger determined by the bearing of the head on the wheel.

2. The combination with a brake head and a hanger for said head, of members extending upward respectively from said hanger and head to a point above the same, and a gravity dog for yieldably holding said members in relative adjustment determined by the bearing of the head on the wheel.

3. The combination with a brake head and a hanger for said head, of members extending upward respectively from said head and hanger to a point above the same, one being provided with a notched segment and the other with a portion adjacent to said segment, and a dog engaging said segment and portion adjacent thereto for yieldably holding the same in adjustment determined by the bearing of the head on the wheel.

4. The combination with a brake head and a hanger provided with a hook for engaging an eye or loop in the head, of an upward extension of said hook, a member attached to said head and extending upward, being provided at its upper end with a laterally extending notched segment adjacent to the upward extension of the hook, and a dog yieldably engaging said notched segment and slidably engaging the upward extension of said hook.

5. The combination with a brake head and a hanger having a hook for a swivel engagement with an eye or a loop in the head, of an upward extension of said hook, a bar secured to said head extending upward therefrom and having a laterally extending segment concentric with the swivel of the head on said hanger, the upper edge of said segment being notched, a gravity dog slidably engaging the upward extension of said hook and having a tooth adjustably engaging said notched segment, and means for holding said dog from accidental disengagement from said segment and extension.

6. The combination with a brake head and a hanger provided with a hook for engaging said head, of an extension of said hook extending upwardly to a point above said hanger, a member movable with said head, and means above said hanger and coöperating with said extension and member for yieldably holding said head in angular adjustment to said hanger determined by the bearing of the head on the wheel.

In testimony whereof I affix my signature.

FREDERICK M. WHYTE.